Feb. 15, 1927.

E. MENEFEE 1,617,860

CLOSURE CONNECTING AND LOCKING ARRANGEMENT FOR MILK CANS

Filed Oct. 6, 1924

Inventor
Elmer Menefee

Attorneys

Patented Feb. 15, 1927.

1,617,860

UNITED STATES PATENT OFFICE.

ELMER MENEFEE, OF ZANESVILLE, OHIO, ASSIGNOR OF ONE-HALF TO WILLIAM H. GOODLIVE, OF ZANESVILLE, OHIO.

CLOSURE CONNECTING AND LOCKING ARRANGEMENT FOR MILK CANS.

Application filed October 6, 1924. Serial No. 742,013.

This invention relates to improvements in closure arrangements for milk cans and light receptacles.

The primary object of this invention is the provision of a means for attaching and locking a closure upon a milk can container, in a novel relation so that the closure is at all times connected to the container, but may be moved therefrom for the purpose of withdrawing the contents of the container, and embodying a novel and simplified method of locking the closure member on the container of the milk can, over that which is shown in my copending application Serial No. 543,941, filed March 16, 1922.

A further and important object of this invention is the provision of improved means for connecting an endless loop to the container and closure portions of the milk can, and cooperatively associating the locking arrangement with the endless loop and the parts of the milk can.

Other objects and advantages of this invention will be apparent during the course of the following detailed description.

In the drawing, wherein similar reference characters designate corresponding parts throughout the several views.

Figure 1:
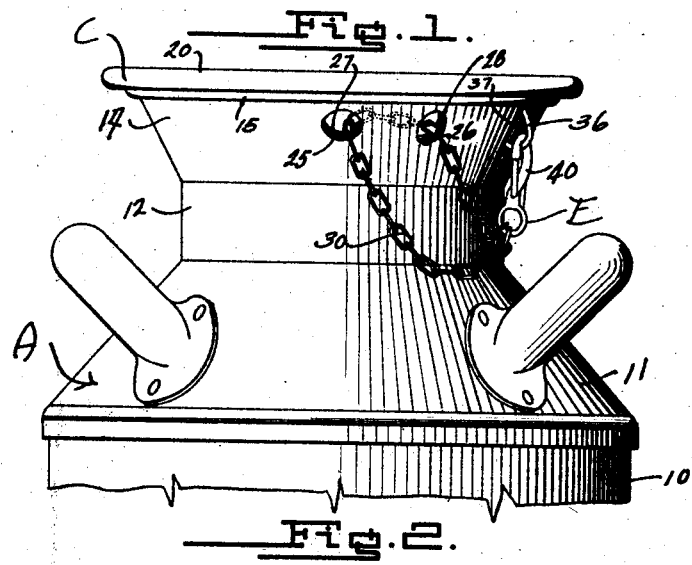
Figure 1 is a fragmentary side elevation of the milk can, showing the closure or lid thereof closed upon the container, and showing the improved endless loop means associated with the parts of the milk can in a connecting and locking arrangement.

In the drawing, wherein for the purpose of illustration is shown only a preferred embodiment of the invention, the letter A may generally designate the milk can, which may include a container B and closure C therefor, and the improved connecting and locking arrangement E.

Referring to the milk can structure A, while the same is of course susceptible of various designs, for the most part the container B includes the cylindrical body portion 10, with the upwardly converging flange 11 terminating in the cylindrical shaped neck portion 12, which provides the restricted exit and entrance opening 13 therefor. From the neck 12 the container B is tapered or sloped upwardly in diverging relation, providing the mouth portion 14, which is substantially frusto-conical in formation, and at the upper edge thereof provides the beaded flange 15.

The closure C may be of ordinary construction for the main part, including the cylindrical shaped inserting body 16 which is adapted to fit in the neck opening 13. Upwardly of the inserting portion 16, the closure or lid C flares outwardly, at 17, in diverging relation away from the inserting portion 16, and which flaring or sloping portion 17, of course, rests on the sloping inside surface of the container tapered portion 14 when the closure is shut upon the container. A top wall 18 extends across the closure C at the juncture of the inserting portion 16 with the upwardly inclined portion 17, and the latter at the top edge thereof is provided with a lateral horizontal flange 20 adapted to overlie the upper edge of the container bead 15, as is conventional construction.

Referring now to the connecting and locking mechanism E for the parts of the can A, the mouth portion 14 of the container B is preferably provided with the circular openings 25 and 26 therein, which are spaced from each other side by side, and which are adapted to respectively align with similarly dimensioned openings 27 and 28 provided in the tapered portion 17 of the closure member C. When these openings are in alignment they receive an endless loop chain 30 of the construction C in looped relation therethrough.

The chain 30 is preferably of the link type, with the links connected in an endless arrangement, and threaded through the aligning openings of the container and closure B and C respectively, with one strand of the endless loop threaded through the openings 25 and 27 which are adapted to align, and the other side strand of said loop threaded through the aligning openings 26 and 28 of the container and closure member.

In addition to the connecting endless loop 30 it is preferred to provide some means by which the closure C may be locked upon the container C, and to this end a staple structure 35 is connected onto the sloping portion 17 of the closure C, including a depending staple loop 36 extending below the outer surface of the sloping portion 17, adapted to be inserted through a transverse slot 37 provided in the tapered mouth wall 14 of the container B when the closure is assembled upon the container, in order to align the openings in the relation above described. Of course, when in this relation the staple part 36 projects outwardly of the outside surface of the inclined mouth wall 14, as is illustrated in Figure 1 of the drawings, and it is preferred to provide a conventional type of snap fastener 40 upon the outer side of the endless chain 30, which may be snapped over the looped staple part 36 to prevent any accidental detachment of the closure C from the container B when the snap fastener is so positioned upon the staple part 36.

Figure 2:
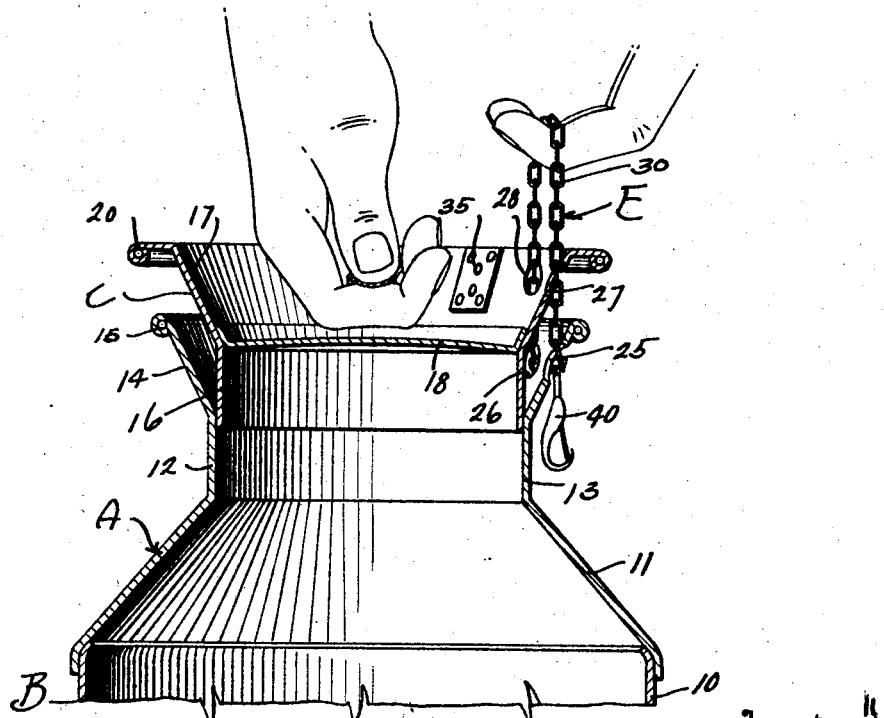
Figure 2 is a fragmentary sectional view of the milk can, showing the manner in which an operator may readily detach the closure from the milk can container after the closure and container have been unlocked.
Figure 2:
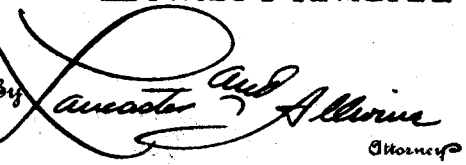

It is believed that the operation of the connecting and locking structure is apparent from the foregoing description. So long as the parts are positioned as illustrated in Figure 1 there cannot be any accidental detachment of the closure C from the container B. However, in order to remove the closure part from the container part it is merely necessary to unsnap the fastener 40 from the staple part 36, and the operator grasping the upper part of the loop in a finger and lifting the same vertically upward aligns the side strands of the loop with the aligning openings of the closure and container parts, and merely by drawing upwardly on the closure part C with the other hand the closure part may be readily detached from the neck of the container B, since the openings 27 and 28 are aligned with the side strands of the endless chain 30, and will readily slide upwardly over said chain, as is illustrated in Figure 2.

From the foregoing description of the invention it is apparent that a novel connecting and locking arrangement for the closure and container parts of milk cans has been provided, which is relatively simple, and which will avoid the troublesome loss of closures from cans; permit a locking of the closure on the container; and facilitate the removal of the closure from the container parts when so desired.

Various changes in the shape, size, and arrangement of parts may be made to the form of the invention herein shown and described, without departing from the spirit of the invention or the scope of the claims.

I claim:

1. In a device of the class described a closure part and a container part of a milk can each having openings therein which are adapted to be aligned when the closure is on the container, an endless loop connecting the container and closure parts through said openings, a staple on one of said parts adapted to extend through a slot on the other part when the said container and closure parts are connected, and fastener means on the loop for engaging said staple when the parts are connected whereby to lock the closure to the container.

2. In a closure arrangement for milk cans the combination of a container including a mouth portion having several openings therethrough, a closure member having several openings therethrough adapted to be respectively aligned with the openings of the container portion when the closure is shut on the container portion, an endless loop slidably disposed through all of said openings of the container and closure portions for connecting said portions so that the closure portion may be removed but not detached from the container portion, and fastener means carried by the loop for locking the closure in closed relation upon the container.

ELMER MENEFEE.